Jan. 6, 1925. 1,521,624
O. R. HERZOG
PROCESS OF DEGREASING RAW WOOL
Filed Aug. 16, 1924
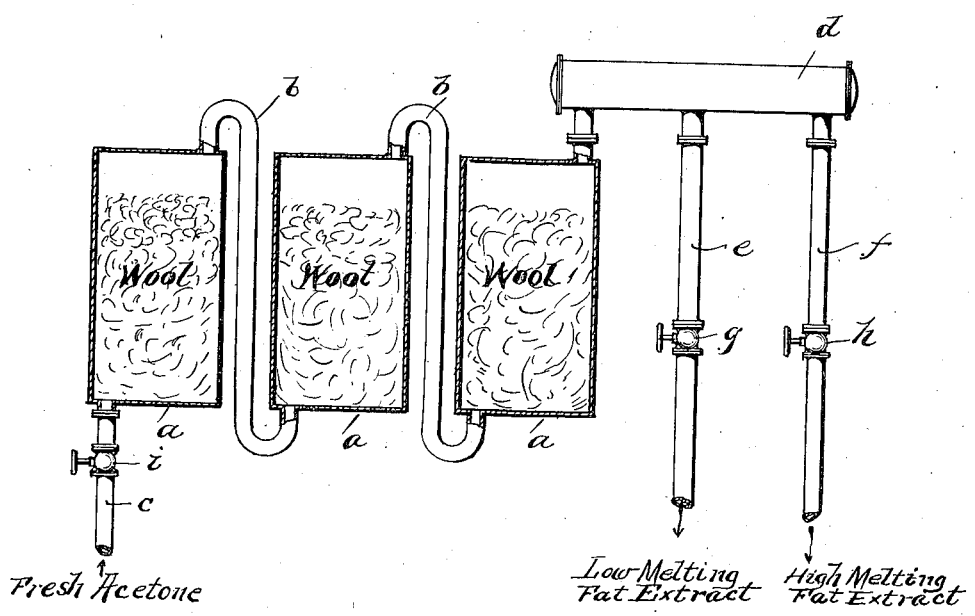

Patented Jan. 6, 1925.

1,521,624

UNITED STATES PATENT OFFICE.

OLIVER REGINALD HERZOG, OF BERLIN-DAHLEM, GERMANY.

PROCESS OF DEGREASING RAW WOOL.

Application filed August 16, 1924. Serial No. 732,571.

*To all whom it may concern:*

Be it known that I, OLIVER REGINALD HERZOG, a citizen of the German Realm, residing at Berlin-Dahlem, Germany, have invented certain new and useful Improvements in Processes of Degreasing Raw Wool; and I do hereby declare the following to be a full, clear, and exact description of the invention, such as will enable others skilled in the art to which it appertains to make and use the same.

This invention relates to the process of degreasing raw wool by means of organic solvents and has for its object to render the process expeditious and cheap without damaging the wool.

For the degreasing of raw wool numerous methods have been employed. Most commonly the material is treated with soda, but the attempts which have been made to remove the wool fat by means of organic solvents have always been abandoned, for the reason that with such means it has not been found possible to limit the extraction of fat to such an extent as to leave the wool itself undamaged.

In accordance with the present invention it has now been ascertained that on treatment of raw wool with liquid acetone a fat content of about 2 to 5% can be obtained. This content corresponds exactly to that in which, as tests have proved, the wool is in the best condition for further treatment.

The process may be carried out in various ways; the following have given very good results:

*Example 1.*—Raw wool is extracted for half an hour at room temperature with 3 to 5 times the volume of acetone and subsequently washed with a little acetone and then washed with water. The quantity of fat remaining in the wool amounts to 3%.

*Example 2.*—The degreasing operation is carried out in stages, the raw wood being introduced into a battery of successive extraction apparatus. These are traversed by acetone and first take up low melting constituents of the wool fat. The high melting portions are brought into solution by further acetone; by heating the acetone to 30 to 40° C. the degreasing operation is favourably influenced, particularly in this second stage.

In the drawing I have shown in vertical section such a battery of extraction vessels, *a*, arranged in series, the acetone being supplied to the first of the series through a pipe *c* controlled by a valve *i*, and the acetone passing from one to the other of the extractors *a* and finally to a manifold *d* from which lead two pipes *e*, *f*, provided with valves *g*, *h*, respectively. Valves, not shown may be provided in the bottoms of the vessels *a* to drain said vessels.

The acetone is passed into the first vessel at *c*, valve *h* being closed, and the chambers *a* being filled with raw wool, preferably, but not necessarily, dried to a moisture content of 2% to 3%. The acetone is allowed to pass through the apparatus until the low melting portions of the wool fat are dissolved, the mixture discharging through pipe *e* and valve *g*. Wash water may be introduced into the apparatus through the pipe *c*.

When a test shows that the fat content in the extract is low, valve *g* is closed, and fresh acetone preferably heated to 30° to 40° C. is passed through the apparatus to dissolve the high melting fat the extract discharging through pipe *f*.

It has been suggested previously to use acetone as a solvent for wool fat which had been extracted with sulphuric acid or talcum from the wash waters, i. e., as a solvent for lanoline. As, however, the difficultly saponifying high melting portions of the wool fat were completely lost and at the most only 50% of the total wool fat could be obtained, acetone has always hitherto been considered unsuitable in practice for the treatment of raw wool.

Surprisingly it has now been found, however, that the treatment of raw wool by means of acetone is exceptionally satisfactory, and that with this treatment the degreasing operation can be carried out to a definite extremely favourable optimum fat content of 2 to 5%, in particular when the method is carried out in accordance with the two examples given and the wool has been subjected to a careful preliminary drying operation until it contains about 2 to 3% of water.

The temperature of extraction plays a substantial part in the satisfactory performance of the method, as has already been mentioned in Example 2. Moreover, it is possible, as experiments have shown, by altering the extraction temperature, to treat the most varied kinds of wool uniformly until they contain the optimum fat content of 2 to 5%.

A simple test will suffice to ascertain the most favourable temperature. Such a result is not attainable with the fat solvents previously suggested for treating raw wool, such as petrol, naphtha, carbontetrachloride, trichlorethylene, as these materials dissolve the wool fat much too easily, so that the wool very rapidly becomes completely degreased, which is exactly what it is generally desired to avoid to-day.

What I claim as my invention is:

1. The process of degreasing raw wool consisting in treating the raw wool with liquid acetone and removing the solution.

2. The process of degreasing raw wool consisting in first drying and then treating the raw wool with liquid acetone, and removing the solution obtained.

3. The process of degreasing raw wool consisting in first treating the raw wool with liquid acetone at substantially atmospheric temperature and then with acetone heated to at least 30° C. and separately removing the liquid mixtures obtained.

4. The process of degreasing raw wool consisting in first drying the raw wool and then treating the wool with liquid acetone at substantially atmospheric temperature to dissolve the low melting portions of the wool fat and removing the solution obtained and then treating the wool with fresh acetone at a temperature not below 30° C. and removing the solution so obtained.

5. The process of degreasing raw wool consisting in first drying the wool then treating it with liquid acetone, at substantially atmospheric temperature removing the solution obtained; then treating the wool with heated liquid acetone at a temperature between 30° and 40° C. and removing the solution so obtained.

In testimony that I claim the foregoing as my invention, I have signed my name.

OLIVER REG. HERZOG.